United States Patent [19]

Coogan et al.

[11] Patent Number: 5,043,381

[45] Date of Patent: Aug. 27, 1991

[54] AQUEOUS DISPERSIONS OF A NONIONIC, WATER DISPERSIBLE POLYURETHANE HAVING PENDENT POLYOXYETHYLENE CHAINS

[75] Inventors: Richard G. Coogan, North Reading; Razmik Vartan-Boghossian, Belmont, both of Mass.

[73] Assignee: ICI Americas, Inc., Wilmington, Del.

[21] Appl. No.: 406,878

[22] Filed: Sep. 13, 1989

Related U.S. Application Data

[63] Continuation of Ser. No. 244,404, Sep. 14, 1988, abandoned.

[30] Foreign Application Priority Data

Sep. 14, 1987 [GB] United Kingdom ................ 8721533

[51] Int. Cl.$^5$ .............................................. C08L 75/04
[52] U.S. Cl. ..................................... 524/591; 524/839
[58] Field of Search ................................. 524/591, 839

[56] References Cited

U.S. PATENT DOCUMENTS

| | | | |
|---|---|---|---|
| 3,905,929 | 9/1975 | Noll | 524/839 |
| 3,920,598 | 11/1975 | Reiff et al. | 524/871 |
| 4,190,566 | 2/1986 | Noll et al. | 524/839 |
| 4,211,683 | 7/1980 | Wenzel et al. | 524/512 |
| 4,408,008 | 10/1983 | Markusch | 524/591 |
| 4,569,981 | 2/1986 | Wenzel et al. | 528/67 |
| 4,594,385 | 6/1986 | Thoma et al. | 524/839 |
| 4,745,151 | 5/1988 | Noll et al. | 524/591 |

*Primary Examiner*—John Kight, III
*Assistant Examiner*—Dennis R. Daley
*Attorney, Agent, or Firm*—Cushman, Darby & Cushman

[57] ABSTRACT

An aqueous dispersion of a nonionic water-dispersible polyurethane having pendent polyoxyethylene chains and one crosslink per 3,000 to 100,000 atomic weight units. The dispersions are useful as coating compositions.

8 Claims, No Drawings

AQUEOUS DISPERSIONS OF A NONIONIC, WATER DISPERSIBLE POLYURETHANE HAVING PENDENT POLYOXYETHYLENE CHAINS

This is a continuation of appliction Ser. No. 07/244,404, filed Sept. 14, 1988.

The invention related to aqueous dispersions and more particularly to aqueous dispersions of nonionic polyurethanes useful as coating compositions.

Aqueous polyurethane dispersions are well known and are used in the production of useful polyurethane products, for example coatings and films. Dispersion of the polyurethane in the aqueous system has been achieved by the use of either external or internal dispersing or emulsifying agents but, in general, the internal agents, which can be ionic or nonionic, have been found to be more satisfactory Water-dispersible polyurethanes of nonionic character generally owe their dispersibility to the presence of pendent polyoxyethylene chains along the main polyurethane backbone. Thus, German Offenlegungsschrift Nos. 2141805 and 2141807 describe the preparation of a water dispersible polyurethane by reacting one mol of a trifunctional isocyanate prepolymer with one mol of a monofunctional polyethylene oxide ether. The difunctional product (containing two NCO groups per molecule) is then dispersed in water and reacted with a difunctional chain extender, for example a diamine, to form an essentially linear polyurethane.

U. S. Pat. No. 3905929 describes water-dispersible nonionic polyurethanes obtained by reacting an organic diisocyanate with an organic difunctional isocyanate-reactive compound and with an organic difunctional isocyanate-reactive compound containing side chain polyethylene oxide units. Aqueous dispersions containing the polyurethanes are used in the production of films and coatings. The use of exclusively difunctional components is said to be an essential feature of the process of making the self-dispersible polyurethanes and the resulting dispersions although in some cases the addition of very small quantities of trifunctional low molecular weigh compounds, e.g. trifunctional isocyanates or trifunctional chain-lengthening agents, may (it is said) improve the properties of the product. Such trifunctional components, it is recommended, should not be used in quantities of more than one equivalent percent, based on all the building components which take part in the polyaddition reaction.

In the process of U.S. Pat. No. 3920598, the polyethylene oxide chain is incorporated by being attached to a diisocyanate molecule by means of an allophanate or biuret linkage. Again, the warning is given that any branching, brought about by the inclusion of very small quantities of trifunctional low molecular weight compounds, should not be higher than about 1%.

It has now been found that aqueous dispersions of water-dispersible nonionic polyurethanes having higher degrees of branching than is recommended in the above mentioned prior art documents have excellent storage stability and can be used in the preparation of elastomeric polyurethanes, for example coatings, having improved physical and chemical properties including high levels of resistance to water and organic solvents.

Accordingly, the invention provides an aqueous dispersion of a nonionic, water-dispersible polyurethane having pendent polyoxyethylene chains and one crosslink per 3,000 to 100,000 atomic weight units.

The pendent polyoxyethylene chain content of the water-dispersible polyurethane may vary within wide limits but in all cases should be sufficient to provide the polyurethane with the required degree of water-dispersibility. The polyoxyethylene side chains may be introduced into the polyurethane by methods described in the prior art. Thus, the polyurethane-forming ingredients may include one or more components having pendent polyoxyethylene chains, for example a dispersing diol and/or diisocyanate having a poly(ethylene oxide) side chain as described in U.S. Pat. No. 3905929 or U.S. Pat. No. 3920598.

The required crosslink density or degree of branching, which does not include crosslinking brought about by secondary reactions, for example allophanate or biuret formation, may be introduced into the polyurethane by including among the polyurethane-forming components at least one component having more than two reactive groups per molecule.

It will be appreciated by those skilled in the art that polyurethane formulations frequently contain minor proportions of reactants, such as water or diamines, which introduce urea groups rather than urethane groups into the overall polyurethane structure. For the purpose of calculating crosslink densities of the products of the present invention such reactants are regarded as polyurethane-forming components.

Thus, the nonionic water-dispersible polyurethane may be the reaction product of:
(a) a nonionic, water-dispersible, isocyanate-terminated polyurethane prepolymer formed by reacting:
   (i) an organic polyisocyanate;
   (ii) at least one organic polyol having a molecular weight in the range 62 to 6000; and
   (iii) a dispersing diol and/or diisocyanate having a pendent polyoxyethylene chain, and
(b) an active hydrogen containing chain extender; wherein said reactants include between 1.0 and 18 equivalents percent of a polyurethane-forming component having a functionality greater than two.

For the purpose of the invention, a "polyurethane-forming component having a functionality greater than two" means a component having more than two reactive groups capable of participating in the formation of the polyurethane, that is to say more than two isocyanate or isocyanate-reactive groups. Such a component may be, for example, a polyisocyanate having three or more isocyanate groups per molecule used in forming the prepolymer, a polyol having three or more hydroxyl groups per molecule used in forming the prepolymer or as a chain extender or a polyamine having three or more amino groups per molecule used as chain extender. If desired, the overall formulation may contain more than one component having a functionality greater than two.

It is preferred that the reactants contain from 2.0 to 10 equivalents percent of polyurethane forming components having a functionality greater than two.

This corresponds to a degree of branching, approximately, of one crosslink per 6,000 to 60,000 atomic weight units.

The polyisocyanate used in making the prepolymer may be an aliphatic, cycloaliphatic, aralphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, 1.4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

Organic polyols having molecular weights in the range 62–6000 which may be used in the preparation of the prepolymer particularly include diols and triols and mixtures thereof but higher functionality polyols may be used, for example as minor components in admixture with diols. The polyols may be polymeric polyols having molecular weights in the range 400 to 6000 or low molecular weight polyols having molecular weights below depending upon the degree of flexibility desired in the final product. Mixtures of polymeric and/or low molecular weight polyols may be used.

Thus a particularly useful nonionic water-dispersible polyurethane is the reaction product of:
(a) a nonionic, water-dispersible, isocyanate-terminated polyurethane prepolymer formed by reacting:
 (i) an organic polyisocyanate;
 (ii) a polymeric polyol having a molecular weight in the range 400 to 6000; and
 (iii) a dispersing diol and/or diisocyanate having a pendent polyoxyethylene chain; and optionally
 (iv) a low molecular weight polyol having a molecular weight less than 400 and.
(b) an active hydrogen containing chain extender; wherein said reactants include between 1.0 and 18 equivalents percent of a polyurethane-forming component having a functionality greater than two.

The polymeric polyols may be members of any of the chemical classes of polymeric polyols used or proposed to be used in polyurethane formulations. In particular, they may be polyesters, polyesteramides, polyethers, polythioethers, polycarbonates, polyacetals, polyolefins or polysiloxanes. Preferred molecular weights are from 700 to 3000.

Polyester polyols which may be used include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof with polycarboxylic acids, especially dicarboxylic acids or their ester-forming derivatives, for example succinic, glutaric and adipic acids or their methyl esters, phthalic anhydride or dimethyl terephthalate. Polyesters obtained by the polymerisation of lactones, for example caprolactone, in conjunction with a polyol may also be used. Polyesteramides may be obtained by the inclusion of amino-alcohols such as ethanolamine in polyesterification mixtures.

Polyether polyols which may be used include products obtained by the polymerisation of a cyclic oxide, for example ethylene oxide, propylene oxide or tetrahydrofuran or by the addition of one or more such oxides to polyfunctional initiators, for example water. ethylene glycol, propylene glycol, diethylene glycol, cyclohexane dimethanol, glycerol, trimethylolpropane, pentaerythritol or Bisphenol A. Especially useful polyethers include polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerisation of tetrahydrofuran.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo and copolymers.

Organic polyols having molecular weights below 400 which may be used in the preparation of the prepolymer particularly include diols and triols and mixtures thereof but higher functionality polyols may be used. Examples of such lower molecular weight polyols include ethylene glycol, diethylene glycol. tetraethylene glycol, bis(hydroxyethyl) terephthalate, cyclohexane dimethanol, furan dimethanol, glycerol and the reaction products, up to molecular weight 399, of such polyols with propylene oxide and/or ethylene oxide.

Diols having pendent polyoxyethylene chains which may be used in the preparation of the prepolymer include those described in the prior art, for example in U.S. Pat. No. 3905929. These diols, because of their function, may be regarded as dispersing diols. Particularly suitable dispersing diols may be obtained by reacting one mole of an organic diisocyanate in which the two isocyanate groups have different reactivities with approximately one mole of a polyethylene glycol monoether and then reacting the adduct so obtained with approximately one mole of a dialkanolamine, for example diethanolamine.

Diisocyanates having groups of different reactivity which may be used in the preparation of the dispersing diols include 2,4-toluene diisocyanate, isophorone diisocyanate and 2,4'-diphenylmethane diisocyanate. Polyethylene glycol monoethers which may be used include the reaction products of ethylene oxide with monohydric alcohols such as methanol. ethanol. tertiary butanol or benzyl alcohol or phenols such as phenol itself. The polyethylene glycol monoethers suitably have molecular weights in the range 250 to 3000 and preferably in the range 500 to 2000.

If desired, the polyoxyethylene chains may contain units of other alkylene oxides in addition to the ethylene oxide units. Thus, polyoxyalkylene chains in which up to 60% of the alkylene oxide units are propylene oxide units, the remainder being ethylene oxide units, may be used.

The preparation of the dispersing diols may be achieved by adding the polyethylene glycol monoether to the diisocyanate at 20°–50° C., optionally in the presence of an inert solvent an catalyst, followed by addition of the dialkanolamine.

Diisocyanates having pendent polyoxyethylene chains which may be used in the preparation of the prepolymer include those described in the prior art, for example in U.S. Pat. No. 3920598. These diisocyanates, because of their function, may be regarded as dispersing diisocyanates. Particularly suitable dispersing diisocyanates may be obtained by reacting two moles of an organic diisocyanate in which the two isocyanate groups have different reactivities with approximately one mole of a polyethylene glycol mono-ether, the initially formed urethane monoisocyanate then reacting at a higher temperature with the excess diisocyanate to form an allophanate diisocyanate having a pendent polyoxyethylene chain.

Suitable diisocyanates and polyethylene glycol monoethers for use in preparing the dispersing diisocyanates have been mentioned above for the preparation of the dispersing diols.

The non-ionic, water dispersible isocyanate-terminated polyurethane prepolymer may be prepared in conventional manner by reacting a stoichiometric excess of the organic polyisocyanate with at least one organic polyol having a molecular weight in the range 62 to 6000 and the dispersing diol or diisocyanate under substantially anhydrous conditions at a temperature between about 30° C. and about 130° C. until reaction between the isocyanate groups and the hydroxyl groups is substantially complete. The polyisocyanate and the active hydrogen containing components are suitably reacted in such proportions that the ratio of number of isocyanate groups to the number of hydroxyl groups is in the range from about 1.1:1 to about 6:1, preferably Within the range of from 1.5:1 to 3:1.

If desired, catalysts such as dibutyltin dilaurate and stannous octoate may be used to assist prepolymer formation and a non-reactive solvent may be added before or after prepolymer formation to control the viscosity. Suitable solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone.

The aqueous dispersions of the invention may be prepared by dispersing the nonionic, water dispersible, isocyanate-terminated polyurethane prepolymer in an aqueous medium and chain extending the prepolymer with an active hydrogen containing chain extender including more than one equivalent per cent of a polyurethane-forming component having a functionality greater than two.

The prepolymer may be dispersed in water using techniques well known in the art. Preferably, the prepolymer is added to the water with agitation or, alternatively, water may be stirred into the prepolymer.

The active hydrogen containing chain extender which is reacted with the prepolymer is suitably a polyol, an amino alcohol, ammonia, a primary or secondary aliphatic, alicyclic, aromatic, araliphatic or heterocyclic amine especially a diamine, hydrazine or a substituted hydrazine. Water-soluble chain extenders are preferred, and water itself may be effective.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris(2-aminoethyl) amine,3,3'-dinitrobenzidine, 4,4'-methylenebis (2-chloroaniline), 3,3'-dichloro-4,4'-bi-phenyl diamine, 2,6-diaminopyridine, 4,4'--diaminodiphenylmethane, menthane diamine, m-xylene diamine, and isophorone diamine. Also materials such as hydrazine, azines such as acetone azine, substituted hydrazines such as, for example, dimethyl hydrazine, 1,6-hexamethylene-bishydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above.

Where the chain extender is other than water, for example a diamine or hydrazine, it may be added to the aqueous dispersion of prepolymer or, alternatively, it may already be present in the aqueous medium when the prepolymer is dispersed therein.

The chain extension can be conducted at elevated, reduced or ambient temperatures. Convenient temperatures are from about 5° to 95° C. or more, preferably from about 10° to about 45° C.

The amount of chain extender employed should be approximately equivalent to the free-NCO groups in the prepolymer, the ratio of active hydrogens in the chain extender to NCO groups in the prepolymer preferably being in the range from 1.0 to 2.0:1. Of course when water is employed as the chain extender, these ratios will not be applicable since the water, functioning both as chain extender and dispersing medium, will be present in a gross excess relative to the free-NCO groups.

The aqueous dispersions of the invention may be advantageously employed as coating compositions, for which purpose they may be further diluted with water and/or organic solvents, or they may be supplied in more concentrated form by evaporation of water and/or organic components of the liquid medium. As coating compositions, they may be applied to any substrate including wood, metals, glass, cloth, leather, paper, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently. It is possible to include an amount of an antimony oxide in the dispersions to enhance the fire retardant properties. The dispersions may also be used as adhesives for materials such as polypropylene, polyester, polyurethane, leather and the like or as binding agents for various particulate materials.

The dispersions, Which suitably have solids contents of from about 20 to 60% by weight, preferably from about 25 to 40% by weight, are stable over a wide pH range (2-13) and are substantially unaffected by electrolytes.

If desired, the dispersions may be blended with other dispersions, for example polyvinyl acetate, polyethylene, polystyrene, polybutadiene, polyvinyl chloride, polyacrylate and other homopolymer and copolymer dispersions.

The invention is illustrated but not limited by the following Examples.

EXAMPLE 1

A 500 ml resin flask equipped with thermometer, overhead stirrer and nitrogen was charged with 170 g of butylene adipate polyester diol of 2000 molecular weight, 70 g of a dispersing diol, 5.0 g of a polypropylene oxide based polyether triol of molecular weight 725, 160 g of methyl ethyl ketone, 54.4 g of isophorone diisocyanate, and 0.4 g of dibutyltin dilaurate. The reaction was warmed to 60° C. for one hour until the isocyanate content dropped to 2.5%.

A dispersion of the prepolymer was prepared by feeding 400 g of the prepolymer at room temperature into 404 g of deionized water followed by the addition of 8.4 g of ethylene diamine. The dispersion had a pH of 10.5, viscosity of 175 cps, and solids content of 33%.

The dispersing diol was prepared as follows: 500 g of Methoxycarbowax 750 dissolved in 150 g of N-methylpyrrolidone was added to 116 g of 2,4-toluene diisocyanate over a thirty minute period at 30° C. At the end of the reaction the isocyanate content was 3.4%. The system was cooled to 25° C. and 62 g of diethanol amine was added. The diol had an OH number of 109.

EXAMPLE 2

A 500 ml resin flask was charged with 84 g of a polycarbonate diol of molecular weight 1000, 60 g of the dispersing diol of Example 1, 1.2 g of trimethylolpropane and 81.7 g of N-methylpyrrolidone. The reactor was heated to 45° C. until all the polyols dissolved, then the system was cooled to 30° C. and 45.5 g of 80:20 toluene diisocyanate was added. The reactor was cooled over an ice bath until the exotherm was complete, then the reactor was heated to 60° C. for one and a half hours until the isocyanate content dropped to 2.89%.

A dispersion of the prepolymer was prepared by adding 240 g of the prepolymer at 22° C. into 272 g of deionized water followed by the addition of 17.2 g of 2-(2-aminoethylamino) ethanol. The dispersion had a pH of 10.4, viscosity of 70 cps and a solids content of 35%.

EXAMPLE 3

A polyurethane dispersion was prepared in a similar manner to Example 1, except a polypropylene oxide diol was used.

The following amounts were used to prepare the urethane:

| Polypropylene oxide diol (OH number 112) | 68.0 |
| Polypropylene oxide triol (OH number 240) | 5.0 |
| Dispersing diol | 40.0 |
| Diisobutyl ketone | 11.3 |
| N-methylpyrrolidone | 44.0 |
| Methyl ethyl ketone | 11.0 |
| Isophorone diisocyanate | 41.6 |
| Dibutyltin dilaurate | 0.4 |
| Hydrazine | 1.56 |
| Water | 243 |

The polyurethane dispersion had a pH of 6.3, viscosity of 80 cps, and solids content of 33%.

The dispersing diol used in this Example was prepared as follows:

250 g of Methoxycarbowax 750 dissolved in 100 g of diisobutyl ketone was added to 74g of isophorone diisocyanate at 25° C. 0.55 g of dibutyltin dilaurate was added and the system exothermed to 44° C. After one half hour, the NCO percent dropped to 3.1 At this point the remaining isocyanate was reacted with 31.2 g of diethanol amine. The diol had an OH number of 104.

EXAMPLE 4

A 500 ml resin flask was charged with 161.2 g of a 1000 molecular weight polytetramethylene diol, 40 g of DC 1248 (Dow Corning Silicon Triol 6000 M W), 120 g of dispersing diol from Example 1, 28 g of N-methylpyrrolidone and 10 g of methyl ethyl ketone. The reactor was cooled to 20° C. and 40.3 g of 80:20 TDI was added. After the exotherm was complete, the reaction was warmed to 50° C. for two hours until the isocyanate content of the prepolymer dropped to 2.64%.

A dispersion of the prepolymer was prepared by adding 200 g of the prepolymer at 25° C. in 250 g of dieionized water-containing 11.9 g of 16% hydrazine. The dispersion temperature was controlled between 25°-28° C. and was allowed to stir one hour after the addition of prepolymer was complete. The dispersion had a pH of 4.9, viscosity of 160 cps and a solids content of 35%.

EXAMPLE 5

A polyurethane was prepared in a similar manner to Example 3 except the trifunctional isocyanate Desmodur N-75(Bayer) was used. The following amounts were used to prepare the urethane:

| Polypropylene oxide diol (OH number 112) | 67.2 |
| Dispersing diol from Example 3 | 50.0 |
| Desmodur N-75 | 11.4 |
| 4,4'-bis(isocyanatocyclohexyl) methane | 41.2 |
| N-methylpyrrolidone | 73.0 |
| Dibutyltin dilaurate | 0.3 |
| Hydrazine | 1.87 |
| Water | 228.5 |

The dispersion had a pH of 6.0, solids content of 33% and a viscosity of 700 cps.

EXAMPLE 6

A 500 ml resin flask was charged with 50 g of Olin Poly-G 76-120, an ethylene oxide capped triol of molecular weight of 1400, 51 g of dispersing diol from Example 1, 2 g of trimethylolpropane and 78.0 g of N-methylpyrrolidone. The reactor was heated to 45° C. until all trimethylolpropane dissolved and was then cooled to 30° C. To the reactor was added 45 g of isophorone diisocyanate and 0.4 g of dibutyltin dilaurate. The reaction was warmed at 50° C. for one hour. The NCO content of the prepolymer is 2.25%. A dispersion of the polymer was prepared by feeding 200 g of the prepolymer at room temperature into 239 g of deionized water containing 11.1 g of 16% hydrazine. The dispersion temperature was controlled between 20°-25° C. and was allowed to stir 2 hours after the addition of prepolymer was complete. The dispersion has a pH of 5.0 and solids content of 30% with low viscosity.

EXAMPLE 7

A polyurethane dispersion was prepared in a similar manner to Example 3 except a 50:50 mixture of 2,4':4,4'-MDI was used. The following amounts were used to prepare the urethane:

| | |
|---|---|
| Polypropylene oxide diol (OH number 112) | 65.0 |
| Polypropylene oxide triol (OH number 240) | 5.0 |
| Dispersing diol from Example 1 | 60.0 |
| N-methylpyrrolidone | 65.4 |
| Methyl ethyl ketone | 13.0 |
| 2,4':4,4'-MDI | 53.3 |
| Hydrazine | 2.24 |
| Water | 253 |

The dispersion has a pH of 66, solids content of 35% and a viscosity of 790 cps.

EXAMPLE 8

A 500 ml resin flask equipped with thermometer, overhead stirrer and nitrogen was charged with 134.5 g of a polypropylene oxide diol of 1000 molecular weight, 70 g of dispersing diol from Example 3, 6.0 g of a polypropylene oxide based polyether triol of molecular weight 725, 5 g of methyl ethyl ketone, 72 g isophorone diisocyanate and 0.3 g of dibutyltin dilaurate. The reaction was warmed to 65° C. for one hour until the isocyanate content dropped to 3.07%.

A dispersion of the prepolymer was prepared by feeding 255 g of the pr®polymer at room temperature into 420 g of deionized water containing 17.4 g of 16% hydrazine. The dispersion was allowed to stir two hours after the addition of prepolymer was complete. The dispersion had a pH of 5.9, viscosity of 43 cps and a solids content of 35%.

EXAMPLE 9

A polyurethane was prepared in a similar manner to Example 2 except bis(4-isocyanatocyclohexyl) methane was used. The following amounts were used to prepare the urethane:

| | |
|---|---|
| Polycarbonate diol (OH number 130) | 52.4 |
| Dispersing diol from Example 3 (MEK as solvent) | 66.4 |
| Trimethylolpropane | 0.60 |
| bis(4-isocyanatocyclohexyl)methane | 69 |
| N-Methylpyrrolidone | 40.4 |
| Methyl ethyl ketone | 40.4 |
| Dibutyltin dilaurate | 0.3 |
| Hydrazine | 3.9 |
| Water | 276 |

The dispersion had a pH of 6.9, solids content of 35% and a viscosity of 570 cps.

EXAMPLE 10

A polyurethane was prepared in a similar manner to Example 2 except water was used as chain extender. The following amounts were used to prepare the urethane:

| | |
|---|---|
| Polycarbonate diol (OH number 122.8) | 168 |
| Dispersing diol from Example 1 | 120 |
| Trimethylolpropane | 2.4 |
| N-Methylpyrrolidone | 163.5 |
| Toluene diisocyanate | 91 |
| Water | 544.9 |

A dispersion of the polymer was prepared by feeding 544.9 of prepolymer at room temperature into 544.9 g of deionized water. The dispersion has a pH of 6.3, solids content of 35% and a viscosity of 153 cps.

EXAMPLE 11

A 500 ml resin flask was charged with 60.6 g of polytetramethylene ether glycol of molecular weight of 250 (Poly THF-250), 162 g of dispersing diol from Example 1, 3 g of trimethylolpropane, 37.2 g of N-methylpyrrolidone, 154.5 g of isophorone diisocyanate and 0.9 g of dibutyltin dilaurate. The reaction was heated to 55°-60° C. and held for one hour. The prepolymer is at this stage 91% NV. After the NCO content of the prepolymer dropped to 4.85%, 126.1 g of t-butanol was added to the prepolymer and mixed well. The NCO content of the prepolymer at this stage after diluting with t-butanol is 3.9% (70% NV). A dispersion of the polymer was prepared by feeding 360 % of the prepolymer at room temperature into 468.6 g of deionized water containing 24.4 g of 16% hydrazine. The dispersion temperature was controlled between 20°-25° C. and was allowed to stir 2 hours at elevated temperature after the addition of prepolymer was complete. The dispersion has a pH of 6.3, solids content of 30% and a viscosity of 1600 cps.

EXAMPLE 12

A polyurethane was prepared in a similar manner to Example 11 except diethylene glycol dimethyl ethyl (diglyme) was used as co-solvent. The following amounts were used to prepare the urethane:

| | |
|---|---|
| Polytetramethylene ether glycol (as in Example 11) | 30.3 |
| Dispersing diol | 81.0 |
| Diglyme | 54.3 |
| Methyl ethyl ketone | 27.2 |
| Trimethylolpropane | 1.5 |
| Isophorone diisocyanate | 77.0 |
| Dibutyltin dilaurate | 0.3 |
| Hydrazine | 3.4 |
| Water | 329.7 |

The dispersion had a pH of 6.4, solids content of 32% and a viscosity of 490 cps.

Another dispersion of the polymer was prepared by feeding 240 g of prepolymer at room temperature into 291.4 g of deionized water followed by 11.2 g ethylene diamine. The dispersion had a pH of 7.3, solids content of 32% and a viscosity of 20cps.

The dispersing diol used in this example was prepared as follows:

To a mixture of 1300 g of Methoxycarbowax 750 and 15 390 g of MEK at 40°-45° C., 301.6 g of 2,4-toluene diisocyanate was added over a thirty minute period. At the end of the reaction, the isocyanate content was 3.6%. The system was cooled to 25° C. and 165.6 g of diethanol amine was added. The diol had an OH number of 109.

EXAMPLE 13

All crosslinked (in prepolymer stage) urethane polymers showed improved chemical and physical properties compared to linear corresponding versions.

|                              | % Elong | Tens | 100%  | 200%  | 300% |
|------------------------------|---------|------|-------|-------|------|
| Linear Polycarbonate/TDI System   | 588     | 455  | 119   | 135   | 156  |
| X-linked Polycarbonate/TDI System | 285     | 850  | 351   | 540   | —    |
| Improved properties          |         |      | 90%   | >100% |      |

| Chemical Resistance        | König | Tol | EtOH | H₂O | MEK | IPA | MeOH |
|----------------------------|-------|-----|------|-----|-----|-----|------|
| Linear Polycarbonate/TDI   | 16    | 8   | W + 4| 4   | 6   | 6   | W + 5|
| X-Linked Polycarbonate/TDI | 22    | 9   | W 5  | 6   | 8   | 7   | W 6  |

W+: Severe whitening
W: Slight whitening

3 Hours Water Spot Test

| | |
|---|---|
| Linear Polycarbonate/TDI system: | After 20 min: Coating became white, lots of blisters and softening |
| X-Linked Polycarbonate/TDI system: | After 180 min: Clear coating, no blisters and no softening |

All other crosslinked polyurethane systems showed improved physical and chemical properties vs linear systems.

EXAMPLE 14

A 500 ml resin flask equipped with thermometer, overhead stirrer and nitrogen was charged with 106 g of a polypropylene oxide diol of 1000 molecular weight, 83 g of a dispersing diisocyanate, 8.6 g of a polypropylene oxide based polyether triol of molecular weight 725, 80.3 g of N-methylpyrrolidone, 16.1 g of methyl ethyl ketone, 26.7 g of isophorone diisocyanate, and 0.4 g of dibutyltin dilaurate. The reaction was warmed to 60° C. for three hours until the isocyanate content dropped to 1.35%.

A dispersion of the prepolymer was prepared by feeding 300 g of the prepolymer at room temperature into 395 g of deionized water containing 9.1 g of 16% hydrazine. The dispersion was allowed to stir two hours after the addition of prepolymer was complete. The dispersion had a pH of 6.6, viscosity of 124 cps and a solids content of 30%.

The dispersing diisocyanate used in this example was prepared as follows: 500 g Methoxycarbowax 750 dissolved in 150 g of N-methylpyrrolidone was added to 232 g of 2,4-toluene diisocyanate over a thirty minute period at 30° C. After 30 minutes at room temperature, the isocyanate content was 9.1%. The system was then heated to 100° C. for 5 hours in the presence of 0.1% of methyl p-toluene sulphonate and 0.005% of zinc acetyl acetate. A pure allophanate diisocyanate which has an NCO-content of 6.0% and an OH number of 102 was obtained.

EXAMPLE 15

A 500ml resin flask equipped with thermometer, overhead stirrer and nitrogen was charged with 78.7 g of a polypropylene oxide diol of 1000 molecular weight, 75 g of the dispersing diisocyanate from Example 14, 6.0 g of trimethylolpropane, 70.0 g of N-methylpyrrolidone, 14.0 g of methyl ethyl ketone, 36.4 g isophorone diisocyanate and 0.4 g of dibutyltin dilaurate. The reaction was warmed to 60° C. for two hours until the isocyanate content dropped to 2.22%.

A dispersion of the prepolymer was prepared by feeding 250 g of the prepolymer at 30°–32° C. into 635 g of deionized water followed by the addition of 10.0 g of 16% hydrazine. The dispersion had a pH of 6.6, viscosity of 1900 cps, and solids content of 20%.

EXAMPLE 16

A polyurethane was prepared in a similar manner to Example 2 except twice the amount of trifunctional polyol was used. The following amounts were used to prepare the urethane:

| | |
|---|---|
| Polypropylene oxide diol (OH number 112) | 84.0 |
| Polypropylene oxide triol (OH number 240) | 16.8 |
| Dispersing diisocyanate from Example 14 | 75.3 |
| N-Methylpyrrolidone | 72.5 |
| Methyl ethyl ketone | 14.5 |
| Isophorone diisocyanate | 26.7 |
| Dibutyltin dilaurate | 0.4 |
| Hydrazine | 1.51 |
| Water | 390 |

The polyurethane dispersion had a pH of 6.9, viscosity of 645 cps, and a solids content of 30%.

EXAMPLE 17

A polyurethane was prepared in a similar manner to Example 3 except diethylene triamine in combination with hydrazine was used. The following amounts were used to prepare the urethane:

| | |
|---|---|
| Polypropylene oxide diol (OH number 112) | 84.0 |
| Polypropylene oxide triol (OH number 240) | 16.8 |
| Dispersing diisocyanate from Example 14 | 75.3 |
| N-Methylpyrrolidone | 72.5 |
| Methyl ethyl ketone | 14.5 |
| Isophorone diisocyanate | 26.7 |
| Hydrazine | 1.37 |
| Diethylene triamine | 0.34 |
| Water | 391 |

The polyurethane dispersion had a pH of 6.9, viscosity of 440 cps, and a solids content of 30%.

We claim:
1. An aqueous dispersion of a nonionic, water dispersible polyurethane having pendent polyoxyethylene chains and one crosslink per 3,000 to 100,000 atomic weight units wherein the nonionic, water dispersible polyurethane is the reaction product of:

(a) a nonionic, water dispersible, isocyanate-terminated polyurethane prepolymer formed by reacting:
   (i) an organic polyisocyanate;
   (ii) at least one organic polyol having a molecular weight in the range of 62 to 6000; and
   (iii) a dispersing diol and/or diisocyanate having a pendent polyoxyethylene chain; and
(b) an active hydrogen containing chain extender; wherein the prepolymer forming reactants (i) and (ii) contain a polyisocyanate having three or more isocyanate groups per molecule and/or a polyol having three or more hydroxyl groups per molecule in such amounts that the total reactants include between 1.0 and 18 equivalents percent of a polyurethane forming component having a functionality greater than two.

2. An aqueous dispersion according to claim 1 wherein the nonionic, water dispersible polyurethane is the reaction product of:
(a) a nonionic, water dispersible, isocyanate-terminated polyurethane prepolymer formed by reacting:
   (i) an organic polyisocyanate;
   (ii) a polymeric polyol having a molecular weight in the range 400 to 6000; and
   (iii) a dispersion diol and/or diisocyanate having a pendent polyoxyethylene chain; and optionally,
   (iv) a low molecular weight polyol having a molecular weight less than 400; and
(b) an active hydrogen containing chain extender; wherein said reactants include between 1.0 and 18 equivalents percent of a polyurethane forming component having a functionality greater than two.

3. An aqueous dispersion according to claim 1 percent of a polyurethane forming component having a functionality greater than two.

4. An aqueous dispersion according to claim 2 wherein the polymeric polyol has a molecular weight of from 700 to 3000.

5. An aqueous dispersion according to claim 1 wherein the diol having a pendent polyoxyethylene chain is a product obtained by reacting one mole of an organic diisocyanate in which the two isocyanate groups have different reactivities with approximately one mole of a polyethylene glycol mono-ether and then reacting the adduct so obtained with approximately one mole of a dialkanolamine.

6. An aqueous dispersion according to claim 1 wherein the diisocyanate having a pendent polyoxyethylene chain is a product obtained by reacting two moles of an organic diisocyanate in which the two isocyanate groups have different reactivities with approximately one mole of polyethylene glycol mono-ether and then reacting the urethane mono-isocyanate so obtained with the excess diisocyanate to form an allophanate diisocyanate.

7. A coating or film derived from an aqueous dispersion as claimed in claim 1.

8. A composite article which includes a film as claimed in claim 2 as an adhesive layer.

* * * * *